UNITED STATES PATENT OFFICE.

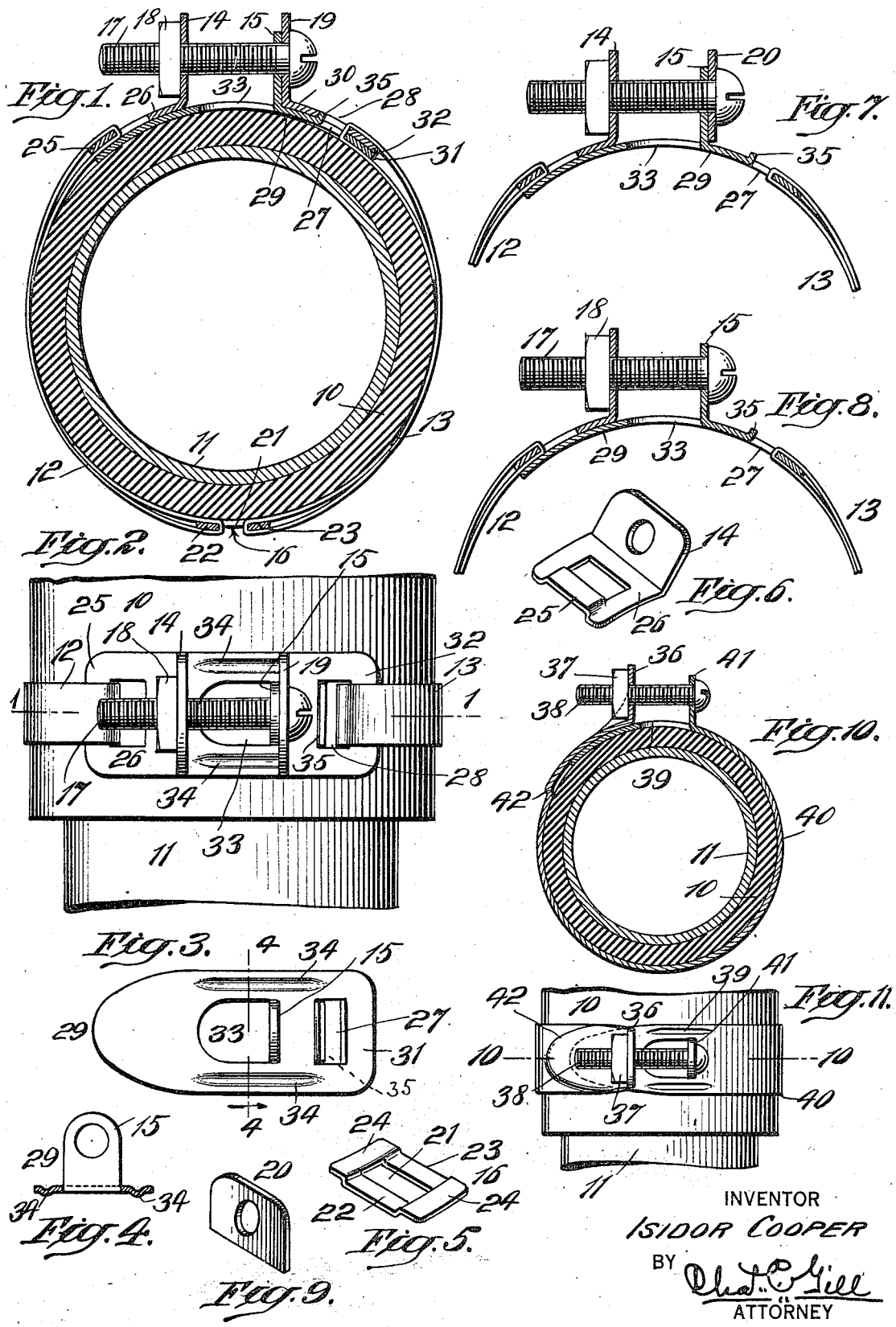

ISIDOR COOPER, OF BROOKLYN, NEW YORK.

CLAMP.

1,278,598.

Specification of Letters Patent.

Patented Sept. 10, 1918.

Application filed March 11, 1913. Serial No. 221,624.

*To all whom it may concern:*

Be it known that I, ISIDOR COOPER, a citizen of the United States, and a resident of Brooklyn, in the county of Kings and State of New York, have invented certain new and useful Improvements in Clamps, of which the following is a specification.

The invention pertains more particularly to clamps of the character employed for binding a piece of hose onto a nipple or pipe, and the object of the invention is to provide a simple and inexpensive clamp capable of being quickly and efficiently applied and also readily adaptable to different diameters of hose or other articles to which it may be applied.

One of the main purposes of the invention is to provide an efficient and inexpensive clamp capable of being readily adjusted for and applied to varying diameters of hose or pipes and also to hose varying in the plies thereof and requiring clamps varying in strength. A further purpose of the invention is to provide a hose clamp formed of flexible sheet metal which may present substantially uniform surfaces to the hose.

The clamp of my invention comprises a metallic flexible body portion, opposed heads at adjacent ends thereof and means for drawing said heads toward each other for binding said body portion on the hose, together with other details to be hereinafter referred to.

The invention will be fully understood from the detailed description hereinafter presented, reference being had to the accompanying drawings, in which:

Figure 1 is a vertical transverse section through a piece of hose and piping having the clamp of my invention applied thereto, the clamp also being shown in vertical transverse section, with the exception of the flexible metallic strip constituting the body portion thereof, and the section being taken on the dotted line 1—1 of Fig. 2;

Fig. 2 is a top view of the same, the hose and piping being partly broken away;

Fig. 3 is a detached top view of a bridging tongue secured to one end of the body portion of the clamp and adapted to span the space between the heads thereof and also to afford an integral head which may be used alone, when desired, for receiving the head of the screw;

Fig. 4 is a transverse section through the same, taken on the dotted line 4—4 of Fig. 3;

Fig. 5 is a perspective view of a coupling member for connecting adjacent ends of the two members of the body of the clamp at points removed from the heads receiving the binding screw and nut;

Fig. 6 is a detached perspective view of one of the heads which I apply to one end of the flexible metal body portion of the clamp;

Fig. 7 is a vertical section through the upper portion of the clamp showing a supplemental bearing piece for the head of the screw applied against the head which is formed integrally with the bridge piece shown in Figs. 3 and 4;

Fig. 8 is a view corresponding with Fig. 7 but omitting the said supplemental bearing piece for the head of the screw, the clamp shown in Fig. 8 being of the construction I would make use of for one-ply hose, whereas the construction shown in Fig. 7 is the one I would adopt for two-ply hose, the supplemental bearing piece at the head of the screw affording additional strength to the clamp;

Fig. 9 is a detached perspective view of the supplemental bearing piece for the head of the screw, said piece being shown in position in Fig. 7;

Fig. 10 illustrates a modification of the invention in that the body portion of the clamp is in one integral strip with one of the bearing heads formed integrally therewith, and Fig. 10 is a sectional view taken on the dotted line 10—10 of Fig. 11, and Fig. 11 is a top view of the modified construction illustrated in Fig. 10, the hose and piping being shown as partly broken away.

In the drawings, 10 designates a piece of hose with the clamp of my invention applied thereon and binding the same upon a piece of piping or a nipple 11, and the said clamp, in the preferred construction thereof, comprises two flexible metallic strips 12, 13, heads 14, 15 at adjacent ends of said strips 12, 13, a coupling 16 at the other adjacent ends of said strips, a screw 17 extending through said heads and a nut 18 engaging one of said heads and being engaged by said screw. When the clamp is to be constructed for hose requiring a strength of clamp in addition to that afforded when the head 15 alone is employed, I will make use of an additional angle head 19, as shown in Fig. 1, or in some cases, as for a two-ply hose, I will omit the angle head 19 and make use of a supplemental head 20 applied against the head 15, which is integral with the bridge tongue 29.

Referring to Figs. 1 and 2, the strips 12, 13 at their ends removed from the securing screw 17, are connected together by the coupling 16, shown in detail in Fig. 5, said ends of said strips being inserted through the opening 21 in said coupling and reversely turned around the cross-bars 22, 23 thereof, as clearly shown in Fig. 1. The cross-bars 22, 23 are offset outwardly to accommodate the thickness of the strips 12, 13 and permit said strips to smoothly bind against the hose 10, while at the same time the end bars 24 of said coupling smoothly engage the exterior surface of said hose, all this being important in securing a gas tight connection of the hose and nipple. The ends of the strips 12, 13 inserted through the coupling member 16 may be variable in extent, since they are free of said coupling member and may be wrapped reversely around the cross-bars 22, 23 at such points as may adapt the clamp for the diameter of hose to which it is to be applied. The clamp is therefore adjustable as to diameter at the point of the connection of the strips 12, 13 with the coupling member 16. The upper end of the strip 12 is threaded through an opening in the head 14, and folded inwardly around the cross-bar 25 of said head, said opening and cross-bar being formed in a curved member 26 of said head 14, which is of substantially right angular formation and at the outer face of its outwardly projecting member serves as a bearing for the nut 18, said member also being apertured to permit the passage therethrough of the screw 17. The head 14 is a separate piece of rather stiff material and is adapted to receive the outer end of the strip 12 in an adjustable manner, said strip being capable of being lengthened or shortened in accordance with the wrapping of the same around the cross-bar 25. The strip 12 may, therefore, be adjusted as to length, either at the coupling 16 or at the cross-bar 25. The strip 13, in the construction shown in Figs. 1 and 2, is threaded through apertures 27, 28, formed in the bridge-piece 29 and angle head 19, and said end of said strip 13 is reversely bent around the cross-bars 31, 32 of said bridge piece and angle-head, and the length of said strip 13 in the final construction of the clamp may be adjusted by the length of the reversely bent end thereof at said cross-bars, the strip 13 being adjustable as to length, both at the coupling 16 and at said cross-bars, thereby adapting the clamp to have a wide range of adjustment for hose varying in diameter. The head 15 is formed integrally with the bridge piece 29, said head being stamped from the middle portions of said bridge piece and bent outwardly, as will be understood on reference to Figs. 1, 2 and 3, and said bridge piece 29 at opposite sides of the opening 33 formed therein by cutting the head 15 therefrom, is corrugated, as at 34, so as to strengthen those portions of the metal at opposite sides of said opening and adjacent to said head 15.

The head 14 is shown more particularly in Fig. 6, and on reference to Fig. 6 it will be noticed that the cross-bar 25 of the base member 26 is recessed upwardly to afford a space for the thickness of the inner layer of the metal strip 12, whereby the downward projection of said thickness of metal is avoided and the clamp may have a more efficient binding action. The recessing outwardly of the cross-bar 25 permits the free end of the tongue or bridge-piece 29 to lie close against the face of the adjacent portion of the strip 12.

The head 19 is substantially a duplicate of the head 14, except as to the recessing of the cross-bar in the base member, and said head will be employed or not as may be desirable. When the head 19 is employed it will be caught upon the metal strip 13, as hereinbefore described, and will lie against the outer face of the integral bearing lip 15, as shown in Fig. 1, and a short flange 35 formed on the inner edge of the opening 27 in said bridge piece will enter the opening 28 of the head 19, and the heads 19, 15 will thereby be kept in proper relation to each other and exert a uniform pull on the folded end of the strip 13. I will make use of the head 19, in all instances in which a strong clamp is required, and in instances in which the clamp is to be applied to one-ply hose, I will omit the head 19 and allow the head of the screw 17 to find a bearing against the integral lip or head 15, this arrangement being illustrated in Fig. 8. When a clamp somewhat stronger than that shown in Fig. 8 and not as strong as that shown in Fig. 1 is required, I will omit the head 19 and apply simply a face-plate 20 against the outer face of the lip or head 15 to receive the head of the screw and coöperate with said lip 15 in affording a reasonably substantial bearing for the screw, and this arrangement of the clamp is shown in Fig. 7. The preferred construction is that shown in Fig. 1, since the clamp there shown is of universal application.

In Figs. 10 and 11 I illustrate a modification of the invention, the clamp there shown being in one integral strip of flexible metal having one end bent outwardly to form a head 36 for the nut 37 and screw 38, and the other end being extended to form a bridge piece or tongue 39 adapted to pass below that end of the strip from which the head 36 is formed. The metal strip as a whole is numbered 40 and at the bridge piece or tongue 39 the metal of said strip is cut and bent outwardly to form the lip or bearing head 41 for the head of the screw 38. The lip or bearing head 41 corresponds exactly with the lip or bearing head 15 cut from the tongue or bridge-piece 29, and in fact the bridge-piece or tongue 29 is duplicated at the end of the strip 40. The end of the strip 40, below which the tongue or bridge piece 39 passes, is recessed, as at 42, to accommodate the end of said tongue or bridge-piece and permit the strip 40 to, with substantial uniformity, bind against the hose.

What I claim as my invention and desire to secure by Letters Patent, is:—

1. A clamp of the character described, comprising two flexible metal strips, a coupling having cross-bars around which the ends of said strips at one side of the clamp are folded inwardly and which permits of the adjustment of the diameter of the clamp, heads at the other ends of said strips, cross-bars at said heads around which said other ends of said strips are folded inwardly and at which the length of said strips may be adjusted to vary the diameter of the clamp, and means at said heads for tightening the clamp on the hose.

2. A clamp of the character described, comprising two flexible metal strips, a coupling having cross-bars around which the ends of said strips at one side of the clamp are folded inwardly and which permits of the adjustment of the diameter of the clamp, heads at the other ends of said strips, cross-bars at said heads around which said other ends of said strips may be adjusted to vary the diameter of the clamp, and means at said heads for tightening the clamp on the hose, said coupling having end bars which are adapted to engage the hose and having its cross-bars offset outwardly to accommodate the thickness of the metal strips so as to permit a close binding action of the strips at said cross-bars against the hose.

3. A clamp of the character described, comprising a flexible metal body portion, heads at the ends thereof at one side of the clamp, a tongue or bridge-piece spanning the space between said heads, and means at said heads for tightening the clamp upon the hose, one of said heads being slit and stamped up from said tongue or bridge-piece, while the other head is of angular formation and slotted in its base portion to receive one end of said body portion, said tongue or bridge-piece being at opposite sides of the opening from which the head is slit and bent outwardly therefrom, longitudinally corrugated.

4. A clamp of the character described, comprising a flexible metal body portion, heads at the ends thereof at one side of the clamp, and means at said heads for tightening the clamp upon the hose, one of said heads being of substantially right angular formation and having a base portion which is slotted to admit one end of said body portion and create a cross-bar around which said end is folded, and said cross-bar being recessed outwardly to receive the thickness and width of said end.

5. A clamp of the character described, comprising a flexible body portion, a bearing head at one end thereof, a bridge-piece connected with the other end thereof and affording a head and adapted to span the space between said heads, a substantially right angular head applied upon said bridge-piece and against the head afforded thereby, and a screw and nut for drawing the heads at opposite ends of said body portion toward each other for tightening the clamp upon the hose, said bridge-piece and the base-member of the head applied thereon being correspondingly slotted to receive their end of said body portion and permit said end to be wrapped around the cross-bars created by said slots.

6. A clamp of the character described, comprising a flexible body portion, a bearing head at one end thereof, a bridge-piece connected with the other end thereof and affording a head and adapted to span the space between said heads, a substantially right angular head applied upon said bridge-piece and against the head afforded thereby, and a screw and nut for drawing the heads at opposite ends of said body portion toward each other for tightening the clamp upon the hose, said bridge-piece and the base-member of the head applied thereon being correspondingly slotted to receive their end of said body portion and permit said end to be wrapped around the cross-bars created by said slots, and said bridge-piece at its slot having an outwardly turned flange entering the slot of the head applied thereupon and engaging the same at the inner edge of the slot formed therein.

Signed at New York city, in the county of New York and State of New York, this 8th day of March, A. D. 1918.

ISIDOR COOPER.

Witnesses:
ARTHUR MARION,
CHAS. C. GILL.